US006895252B2

(12) United States Patent
Pugel

(10) Patent No.: US 6,895,252 B2
(45) Date of Patent: May 17, 2005

(54) ECONOMICAL EXTENSION OF THE OPERATING DISTANCE OF AN RF REMOTE LINK ACCOMMODATING INFORMATION SIGNALS HAVING DIFFERING CARRIER FREQUENCIES

(75) Inventor: Michael Anthony Pugel, Noblesville, IN (US)

(73) Assignee: Thomson Licensing SA, Boulogne-Billancourt ( * ) Notice: Subject to any disclaimer, the term of this patent is extended or adjusted under 35 U.S.C. 154(b) by 1 day.

(21) Appl. No.: 09/852,570

(22) Filed: May 10, 2001

(65) Prior Publication Data

US 2002/0187796 A1 Dec. 12, 2002

(51) Int. Cl.[7] ............................ H04B 7/00; H04Q 7/00

(52) U.S. Cl. ........................ 455/500; 455/66.1; 455/46; 348/723; 348/724; 348/734; 340/825.72; 340/825.75; 340/541; 340/825.73; 375/268; 375/300; 375/310

(58) Field of Search ................................ 455/500, 66.1; 340/825.72, 825.75, 14.2, 14.5; 348/734, 725, 722, 724, 726, 723; 359/142, 143, 145, 181, 172, 148

(56) References Cited

U.S. PATENT DOCUMENTS

| | | | | | |
|---|---|---|---|---|---|
| 4,229,765 | A | * | 10/1980 | Sanger | 348/734 |
| 4,267,606 | A | * | 5/1981 | Stelter et al. | 359/148 |
| 4,509,211 | A | | 4/1985 | Robbins | |
| 4,527,204 | A | * | 7/1985 | Kozakai et al. | 386/46 |
| 4,809,359 | A | | 2/1989 | Dockery | |
| 4,866,434 | A | | 9/1989 | Keenan | |
| 4,897,883 | A | * | 1/1990 | Harrington | 359/145 |
| 5,128,668 | A | * | 7/1992 | Ikezaki et al. | 340/825.72 |
| 5,142,397 | A | | 8/1992 | Dockery | |
| 5,214,422 | A | * | 5/1993 | Cullimore | 340/825.72 |
| 5,299,264 | A | | 3/1994 | Schotz et al. | |
| 5,321,542 | A | | 6/1994 | Freitas et al. | |
| 5,329,370 | A | | 7/1994 | Yazolino et al. | |
| 5,410,735 | A | | 4/1995 | Borchardt et al. | |
| 5,585,953 | A | * | 12/1996 | Zavrel | 359/152 |
| 5,670,958 | A | | 9/1997 | Hauser et al. | |

(Continued)

FOREIGN PATENT DOCUMENTS

| | | |
|---|---|---|
| JP | 2001-8278 | 1/2001 |
| WO | WO9305580 A | 3/1993 |

*Primary Examiner*—Marceau Milord
(74) *Attorney, Agent, or Firm*—Joseph J. Tripoli; Joseph J. Laks; Reitseng Lin

(57) ABSTRACT

A system for economically extending the effective operational range of an infrared remote control system having a remote control unit with an infrared transmitter, and a controlled device having an infrared receiver. The system includes a first transmitter to receive IR signals from the remote control unit and transmit an RF output signal corresponding to the infrared signal received from the remote control unit. The RF signal is received by an RF receiver which generates a second IR signal corresponding to the received radio signal. The second IR signal is transmitted to and received by the IR controlled device. In some cases, the first IR control signal, and in all cases, the RF, signal include information/data concerning the IR carrier frequency. This information/data of IR carrier frequency, instead of the RF transmission of the actual IR carrier frequency, permits a reduction of the RF bandwidth since the full frequency spectrum of possible IR carriers need not be transmitted, thus permitting amplitude shift keying (ASK) modulation to be used. The RF receiver decodes the received signal and uses the information/data to configure a second IR control signal that is compatible with and transmitted to the controlled device.

3 Claims, 5 Drawing Sheets

U.S. PATENT DOCUMENTS

| | | | | | |
|---|---|---|---|---|---|
| 5,815,108 | A | | 9/1998 | Terk | |
| 5,872,562 | A | | 2/1999 | McConnell et al. | |
| 5,894,278 | A | * | 4/1999 | Kubo et al. | 340/825.72 |
| 6,127,941 | A | | 10/2000 | Van Ryzin | |
| 6,219,109 | B1 | * | 4/2001 | Raynesford et al. | 348/734 |
| 6,400,480 | B1 | * | 6/2002 | Thomas | 359/142 |
| 6,496,122 | B2 | * | 12/2002 | Sampsell | 340/825.69 |
| 6,529,556 | B1 | * | 3/2003 | Perdue et al. | 375/260 |

* cited by examiner

ECONOMICAL EXTENSION OF THE OPERATING DISTANCE OF AN RF REMOTE LINK ACCOMMODATING INFORMATION SIGNALS HAVING DIFFERING CARRIER FREQUENCIES

FIELD OF THE INVENTION

The present invention relates to a system for extending the effective operating distance of an infrared (IR) remote control system, and more particularly, to such a system wherein the RF transmission uses ASK modulation.

BACKGROUND

The present invention relates to an arrangement and device for remote control for electronic devices, in particular of entertainment electronics.

There are many types of remote controlled electronic devices which utilize infrared signals between a remote control unit and the controlled device. Such types of commonly known controlled devices include, for example, VCRs, television sets, audio amplifiers, DVD players and the like.

Devices for extending the distance range for an IR remote control are known, e.g., U.S. Pat. Nos. 6,127,941; 5,142,397, and 4,809,359. The remote control extension system sends a signal, connected in a wireless manner, e.g., microwave, radio transmission, or the like by means of a transmitting device, to a receiving device, which provides an IR signal containing specific commands which are executable by a remote controllable device.

Also known are remote control transmitters which can recognize foreign transmission formats, such as infrared formats from other manufacturers or for other types of devices, store these and transmit them again as required. Such infrared remote control transmitters are also called "learning" remote controls, e.g., U.S. Pat. Nos. 5,515,052 and 4,626,848.

SUMMARY OF THE PRESENT INVENTION

A system for economically extending the effective operational range of an infrared remote control system having a remote control unit with an infrared transmitter, and a controlled device having an infrared receiver. The system includes a first transmitter to receive IR signals from the remote control unit and transmit an RF output signal corresponding to the infrared signal received from the remote control unit. The RF signal is received by an RF receiver which generates a second IR signal corresponding to the received radio signal. The second IR signal is transmitted to and received by the IR controlled device. In some cases, the first IR control signal, and in all cases, the RF, signal include information/data concerning the IR carrier frequency. This information/data of IR carrier frequency, instead of the RF transmission of the actual IR carrier frequency, permits a reduction of the RF bandwidth since the full frequency spectrum of possible IR carriers need not be transmitted, thus permitting amplitude shift keying (ASK) modulation to be used. The RF receiver decodes the received signal and uses the information/data to configure a second IR control signal that is compatible with and transmitted to the controlled device.

BRIEF DESCRIPTION OF THE DRAWINGS

Referring now to the drawings.

DETAILED DESCRIPTION OF A PREFERRED EMBODIMENT

Figure 1A:
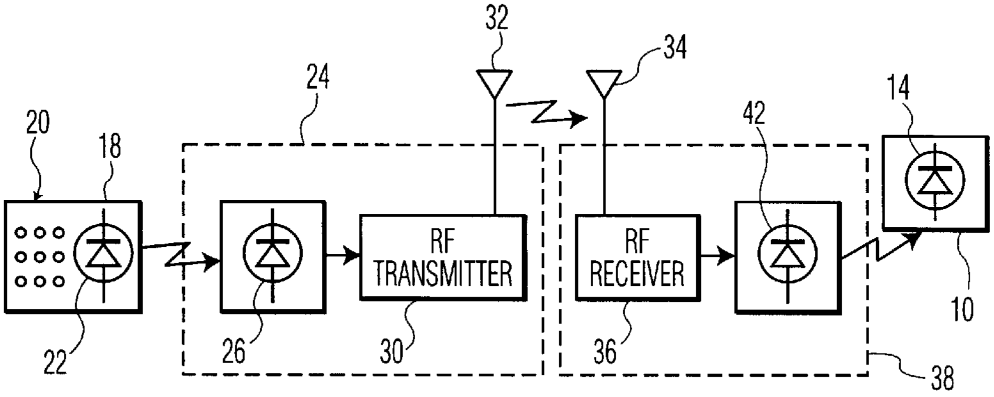
FIG. 1A shows an arrangement according to two embodiments of the present invention.

With reference to the drawings, two preferred embodiments of the present invention are shown in FIG. 1A and comprise one or more IR controlled devices 10, such as a VCR, DVD player, stereo system components or the like. Each IR controlled device 10 includes a photodetector 14, which is adapted to receive an IR signal to control the operation of controlled device 10.

A remote control unit 18 is typically used to control the operation of controlled device 10. The remote control unit typically includes a keypad 20 which, when one or more of the keys of keypad 20 are pressed, generates an infrared signal transmitted from an infrared emitter 22. As is well known in the art in order to operate, an infrared remote control unit is a line of sight device, i.e. the remote control unit 18 must be within the line of sight of the photodetector 14 of the controlled device 10, or else the controlled device 10 can be receptive to IR reflections off of the walls of the common room or other enclosure.

In order to overcome the line of sight (and reflections) limitation, the present invention provides a system to extend the effective range of such an infrared remote control system. As shown in FIG. 1A, the system comprises a first RF transmitter 24 having an infrared receiver or photodetector 26 which can be positioned in a room or enclosure along with controlled device 10. Photodetector 26 is responsive to the infrared signal transmitted from the remote control unit 18 and transmitter 24 generates an RF signal which is representative of the infrared signal received from remote control unit 18. As used herein, "RF" means electromagnetic energy below the far IR frequency range. This RF signal, which in the exemplary embodiment is an ultra high frequency (UHF) signal at antenna 32, is representative of the infrared signal generated by remote control unit 18.

The radio signal from transmitter 30 is, in turn, received by the antenna 34 of an RF receiver 38 which can be positioned outside of the line of sight (or reflections) of controlled device 10, e.g., in another room or other enclosure. RF receiver 38 generates an IR signal which is representative of the received RF signal from RF transmitter 30. This output signal of RF receiver 36 activates controlled unit 10 in the desired fashion. Additional RF receivers 36 for other controlled devices 10 in a plurality of enclosures can be used without the need for multiplexing RF receivers 38.

The modulation of the RF signal of the exemplary embodiment is amplitude shift keying (ASK). This type of modulation is used because it affords substantial benefits and economies compared to the commonly used frequency shift keying (FSK) modulation, as will be further discussed below. These two types of modulation/demodulation are well known in the prior art, and thus, in the interest of brevity, ASK and FSK modulation and demodulation techniques and circuitry therefor will not be further discussed except as deemed necessary to understand the present invention and/or claims.

There are bands of RF frequency which are allocated for low power unlicensed transmissions. In the U.S., the FCC currently allows the use of low power transmissions, i.e., in the range of 295–365 MHz. The average power for such transmissions is limited, e.g., to less than five milliwatts average power into the output stage. For transmitting power, FSK modulation requires complex electronics and a complex modulator compared to ASK modulation which can be achieved by simple AM modulation of the power supply of the class C output stage. Further, whereas FSK transmission is transmitting a carrier all of the time so that the same average power is constantly being transmitted, albeit at varying frequencies, the ASK transmission has a duty cycle "on" time and thus, the peak power can be much higher for the same average power into the transmitter output stage. Thus, ASK modulation will carry further in distance. It should be noted that the shorter the ASK modulation duty cycle "on" time, the higher the peak power can be for the same average power into the output stage, and thus, the further the distance that the signal can be transmitted.

On the receiver side, an ASK system is also more economical than an FSK system. An ASK receiving system basically needs a diode, maybe some amplification and tuned circuit prior to the diode, and a low pass filter after the diode. In contrast, an FSK receiving system requires a relatively expensive frequency discriminator, e.g., a ratio detector, and enough RF and IF wide-band amplification for the signal to be clipped prior to detection. Thus, compared to the FSK system, the ASK system is both more economical and has a longer range due to its much higher peak power as discussed above. Needless to say, given enough signal strength, the FSK system has lower noise. However, in the present case, the ASK system is more cost effective and has a greater transmission distance than the FSK system normally used.

However, the ASK modulation system has a lower bandwidth capability. IR carrier frequencies can vary from 30 KHz to 500 KHz. If the RF transmissions were required to have a bandwidth sufficient to accommodate the IR carrier range from 30 KHz to 500 KHz, an ASK modulation system would not be sufficient and an FSK system would have to be used, which is currently the case in the prior art. However, if instead of the RF transmission needing to have the capability of transmitting the 500 KHz or higher IR carrier frequency, it has been found that a four bit nibble of information is sufficient to define the IR carrier frequency without having to actually transmit the IR carrier frequency. This is because there are a limited number of commonly used IR carrier frequencies and referral can be made to a look-up table which will tell the system which IR carrier frequency is the selected one. Since the present system is required to add only four bits to the signal, the RF system need not be capable of transmitting a 500 KHz IR carrier signal, and a lower bandwidth system can be used, i.e., an ASK modulated RF system with the advantages discussed above over the FSK system.

The present system can be configured in three ways. Still referring to FIG. 1A, in a first embodiment a four bit nibble defining the first IR carrier frequency is added by RF transmitter 30 instead of RF transmitting the actual IR carrier, which is stripped from the signal. As used herein RF transmitter 30 is also referred to an IR/RF translator. This is done after analyzing the IR carrier frequency received from the remote control 18. In this case, RF receiver 36 also referred to herein an RF/IR translator, configures the second IR signal so that the IR carrier frequency is the correct frequency for IR remote controllable device 10, as decoded from the data included in the RF signal. This permits the remote control which came with the IR remote controllable device to be used.

Still referring to FIG. 1A, a second embodiment is to use a remote control which can be taught, e.g., a learning remote which, e.g., uses a look-up table for the IR remote controllable device in its ROM, which may or may not be part of its microprocessor, for determining what the IR carrier frequency is and add such information as a nibble to the digital word transmitted to RF transmitter 30. In such a case, RF transmitter 30 need not analyze the IR signal from remote control 18 to determine the IR carrier frequency but can read the carrier frequency information directly from the data added to the IR signal and transmit such data in a form understandable by RF receiver 36, without including the IR carrier itself in its transmission. In such a case, if the IR carrier is provided by the remote control, it is stripped from the signal which is RF transmitted. Like above, RF receiver 36 configures the second IR signal so that the IR carrier frequency is the correct frequency for the IR remote controllable device. In such a case, the learning IR remote control can be used, or an off-the-shelf universal remote control, which happens to include such information about the IR carrier frequency as part of their transmitted word, can be used. In both the first and second embodiments, since the IR carrier is not included in the RF transmission, the RF transmitter carrier can be ASK modulated, as discussed above.

Figure 1B:
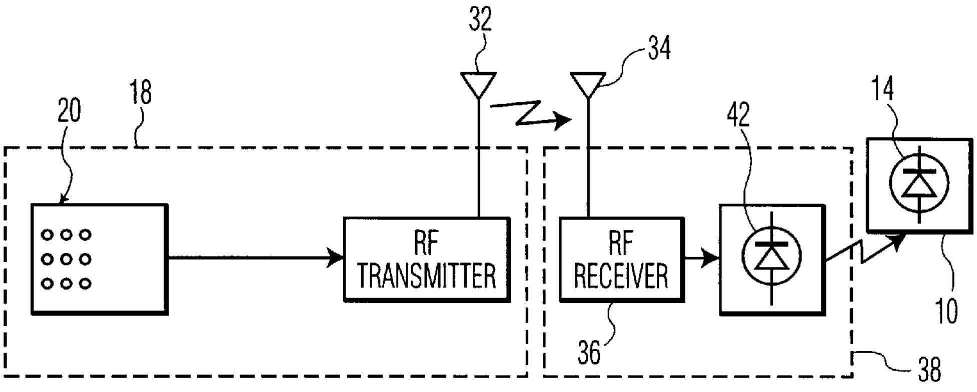
FIG. 1B shows an arrangement according to a third embodiment of the present invention.

Referring now to FIG. 1B, in a third embodiment, remote control 18, instead of being just an IR remote control, can also be an RF remote control, which means that an RF output signal can be directly received by receiver 36, thus eliminating a separate transmitter 30. However, the RF remote control, like before, would not RF transmit the IR carrier but transmits a four bit nibble of data defining what would be the IR carrier frequency, and the RF carrier is ASK modulated. Receiver 38 still provides an IR control signal having the correct IR carrier frequency for remotely controlling the IR remote controllable device. It should be noted that in such a case, the RF remote control and RF transmitter are located within the same housing. In a like manner, for the two other embodiments discussed above in connection with FIG. 1A, the IR remote control 18 and the RF transmitter 30 can both be located within a common housing.

The RF remote also transmits IR, Thus, it is a simple matter of taking the IR code, appending the 4 bit nibble representative of the IR frequency, and coupling the nibble to the RF remote transmitter section. The micro in the remote already knows what IR frequency was needed because it had to synthesize it for the IR transmit, So it is a trivial matter to have the micro create this 4 bit nibble and append it to the RF message. This is similar to what the transmitter 30 is doing, but it eliminates the need for such a separate step.

Turning now to the four bit nibble, the size is based upon the number of carrier frequencies currently used. Thus, a four bit nibble designates 16 possible IR nominal carrier frequencies. However, more than four bits can be used if the situation warrants, e.g., an eight bit byte would be capable of designating 256 possible IR carrier frequencies. However, even such an enlarged IR carrier frequency bit length would still provide the advantages of ASK modulation, i.e., it is still more economical to include such information defining the IR carrier frequency than to use an RF bandwidth sufficient to transmit the full range of IR carrier frequencies which can be used, due to the substantial reduction in transmission bandwidth required, and the increased peak power to average power ratio.

For information purposes, a characteristic of a commonly used IR remote control is as follows:

| Characteristic | Min. | Typ. | Max. | Units |
|---|---|---|---|---|
| Infra-red wavelength | 915 | 950 | 975 | Nm |
| Modulation frequency | 55.1 | 56.8 | 58.5 | KHz |
| | 69 | 75 | 81 | |
| Modulation duty-cycle | | 50 | | % |

Figure 2:
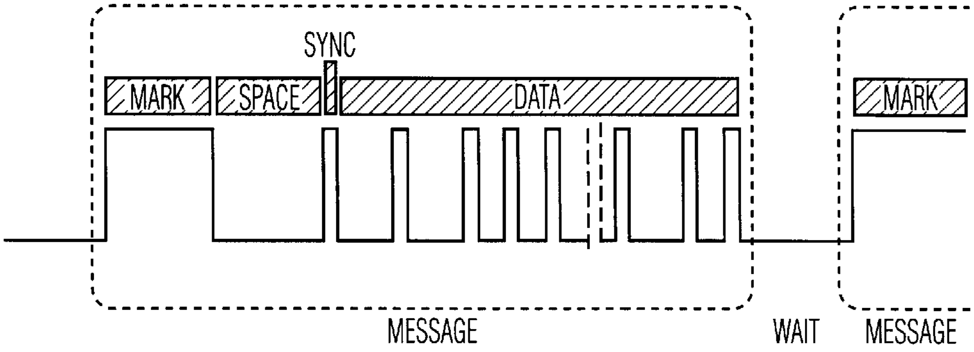
FIG. 2 shows a timing chart for the data of an IR remote control.

FIG. 2 shows a timing chart for a prior art IR remote control. IR transmissions comprise bursts of amplitude-modulated IR, with data encoded by means of the interval between pulses (without IR). This is called Pulse Position Modulation (PPM) because the width of the pulses do not vary, only the timing of the leading edges. This is why there is a sync pulse which sets the initial timing. A timer looks at discrete times after this sync pulse for another leading edge of a pulse to determine what information was sent (bit 0, bit 1, end of transmit, etc). These are all based on timing from the last valid pulse edge received. This PPM data, without the four bit nibble of data designating the IR carrier frequency, is then modulated onto the IR carrier for the normal transmission of the IR control code.

Referring again to FIG. 2, for the IR envelope, a logic "high" represents the presence of modulated IR, and a logic "low" represents the absence of IR. The mark and space convey no information; they are present to settle the automatic gain-control (AGC) in the IR receiver. The first sync pulse signals the start of the data and establishes the point from which to begin timing the subsequent data bits. The intervals between consecutive IR pulses encode twenty-four data bits.

Figure 3:
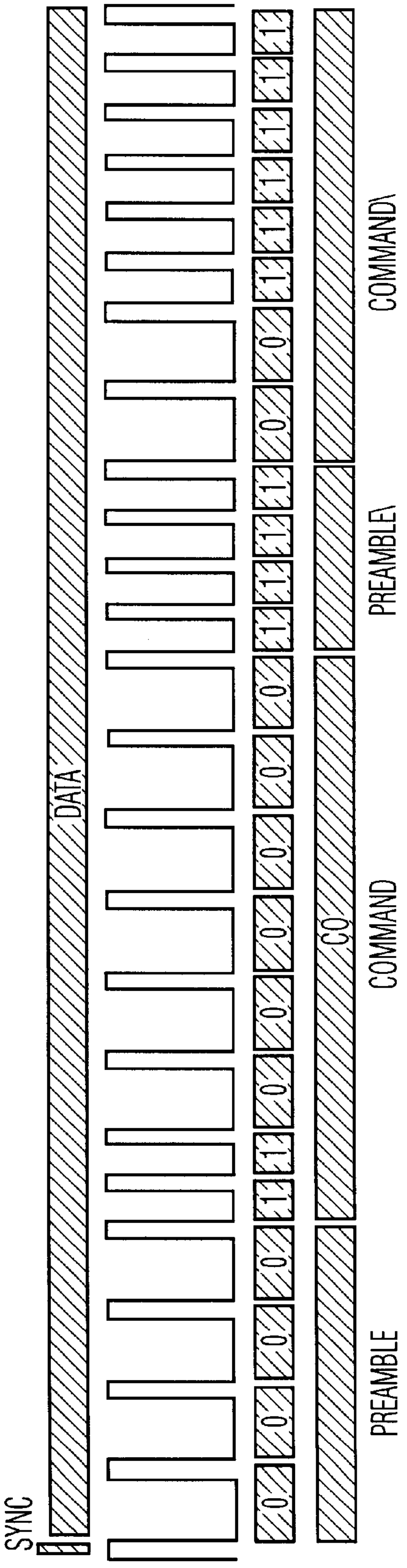
FIG. 3 shows a detailed timing chart for the data of FIG. 2.

FIG. 3 shows a detailed timing chart of the timing chart of FIG. 2 showing a protocol for sending information. The first four bits represent the preamble (device address), and the next eight bits represent the specific command followed by the logical complements of the preamble and data (four and eight bits, respectively). Data is transmitted most significant bit first.

FIG. 3 shows the details of the data portion of a typical message shown in FIG. 2. These elements form a complete message. As long as the remote button is depressed and the command is considered to be active, the identical message is continuously repeated with the specified wait between messages. No partial messages are transmitted. If the key is released before a complete message has been transmitted, the remaining portion will still be transmitted. Note that each command is sent twice.

Figure 4:
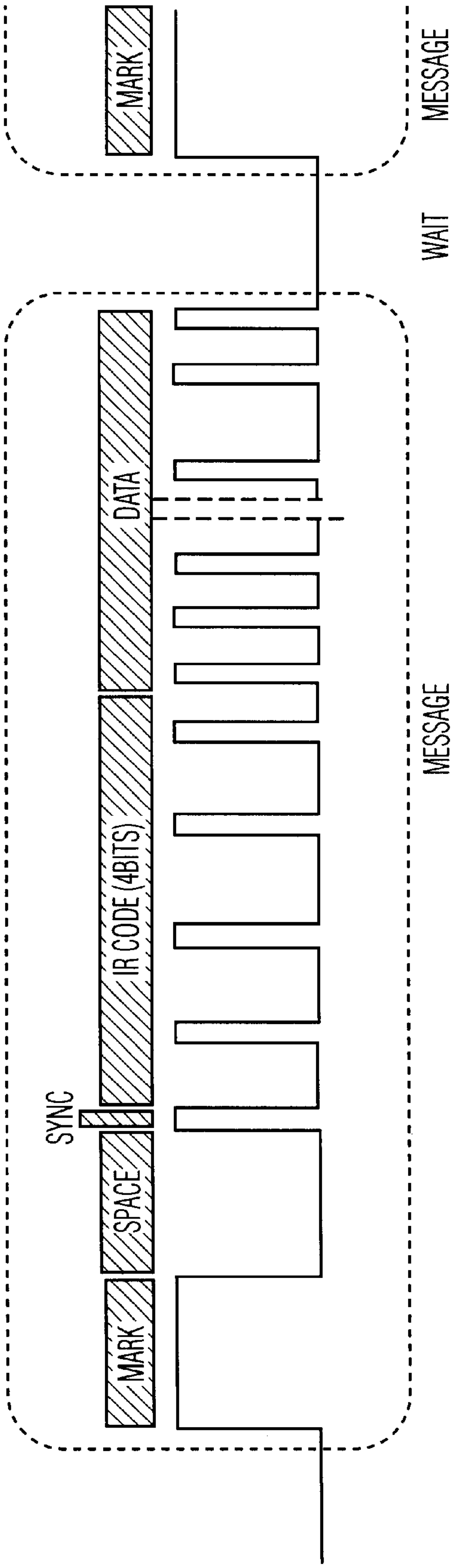
FIG. 4 shows the timing chart for the data of FIG. 2 with data for the IR carrier frequency added.
Figure 5:
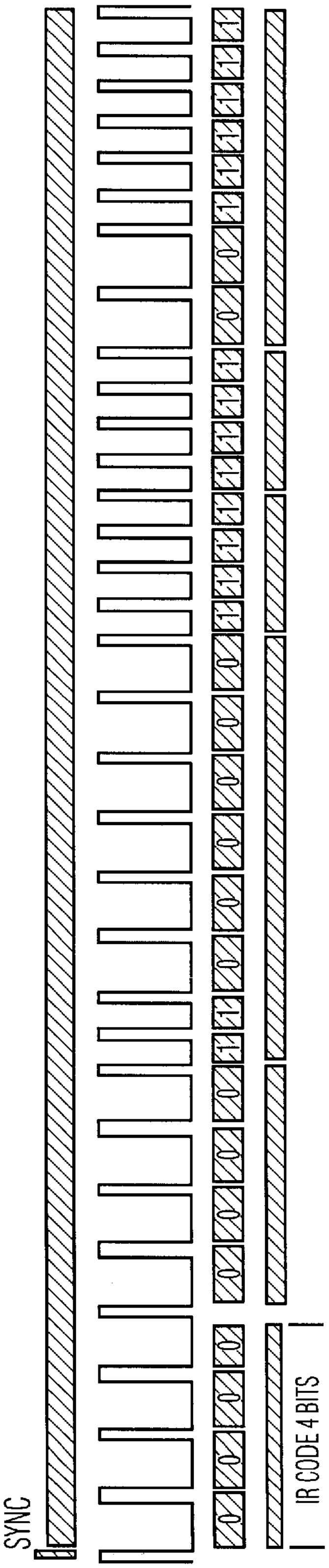
FIG. 5 shows the detailed timing chart of the data of FIG. 4 with data for the IR carrier frequency added.

It is within the contemplation of the present invention that the four bit nibble would be inserted before each preamble of data, i.e., after the mark and space. This arrangement is shown in FIGS. 4 and 5 where the four bit nibble is appropriately indicated. However, such an arrangement is only exemplary and other arrangements can be used.

Figure 6:
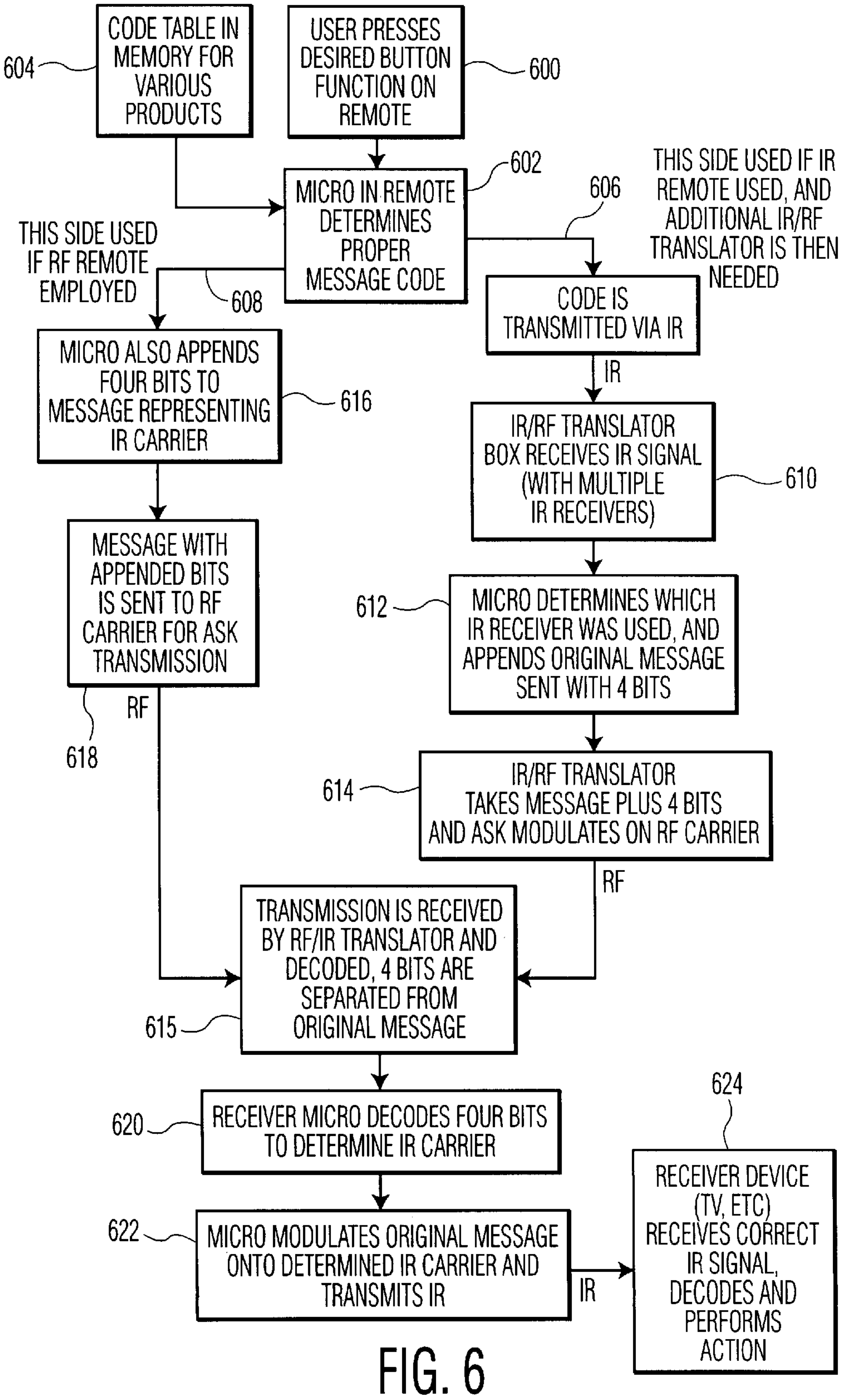
FIG. 6 is a flow-chart showing the operation of the system according to aspects of the present invention.

FIG. 6 shows a flow chart of the operations concerning the four bit nibble for identifying the IR carrier frequency for the embodiments, as follows: at 600 the user presses a desired button function on remote 18 and, at 602 the microprocessor in the remote determines the proper message code using the code table in memory for various products in 604. Now three possibilities exist with the two embodiments of FIG. 1A being shown in branch 606 and the embodiment of FIG. 1B being shown in branch 608.

Taking branch 606 first, at 608 the code is transmitted via IR using the correct IR carrier frequency for embodiment one and without the IR carrier but with the IR carrier frequency data for embodiment two, at 610 transmitter 30 receives the IR signal, at 612 the microprocessor appends the original message with the four bit data if it has not been added at 602, and strips the message of the actual IR carrier frequency if it had been sent according to the second embodiment, at 614 the message from 612 with the IR frequency data and without a carrier is ASK modulated onto an RF carrier which is received by receiver 36 at 615, where the message is decoded and the four bit nibble is separated from the original message.

Taking branch 608 where remote control 18 is an RF remote, at 616 the microprocessor appends the four bit nibble to the message representing the IR carrier frequency and strips the IR carrier, if any, from the message. At 618, the message with the appended bits is ASK modulated onto an RF carrier, which is received at 615.

At 620 the receiver microprocessor decodes the four bits to determine the IR carrier frequency and at 622 reconstructs the IR message at the specified IR carrier frequency, and transmits the IR message which is received at 624 by the IR remote controllable device.

What is claimed is:

1. An RF transmission system comprising:

an RF transmitter having a first carrier at a first carrier frequency which is modulatable by an information containing signal having a second carrier at a second carrier frequency;

means for deleting the second carrier and substituting data identifying the second carrier frequency in place of the actual carrier for transmission, and an RF receiver for receiving the RF transmission, the RF receiver including means for reconstructing the information containing signal including the designated carrier frequency by using the substituted data.

2. An RF transmission system comprising:

an RF transmitter having a first carrier at a first carrier frequency which is modulatable by an information containing signal having a second carrier at a second carrier frequency;

means for deleting the second carrier and substituting data identifying the second carrier frequency in place of the actual carrier for transmission, and an RF receiver for receiving the RF transmission, the RF receiver including means for reconstructing the information containing signal including the designated carrier frequency by using the substituted data, the RF carrier is ASK modulated by the information containing signal with substitute data.

3. An RF transmission apparatus comprising:

an RF transmitter having a first carrier at a first carrier frequency which is modulatable by an information containing signal having a second carrier at a second carrier frequency; and means for deleting the second carrier and substituting data identifying the second carrier frequency in place of the actual carrier for transmission.

* * * * *